March 24, 1970  J. S. COURTNEY-PRATT ET AL  3,502,969

ERROR CORRECTION IN CAPACITIVE GAGES

Filed Dec. 30, 1966  2 Sheets-Sheet 1

INVENTORS J.S. COURTNEY-PRATT
E. EISNER

BY  *[signature]*

ATTORNEY

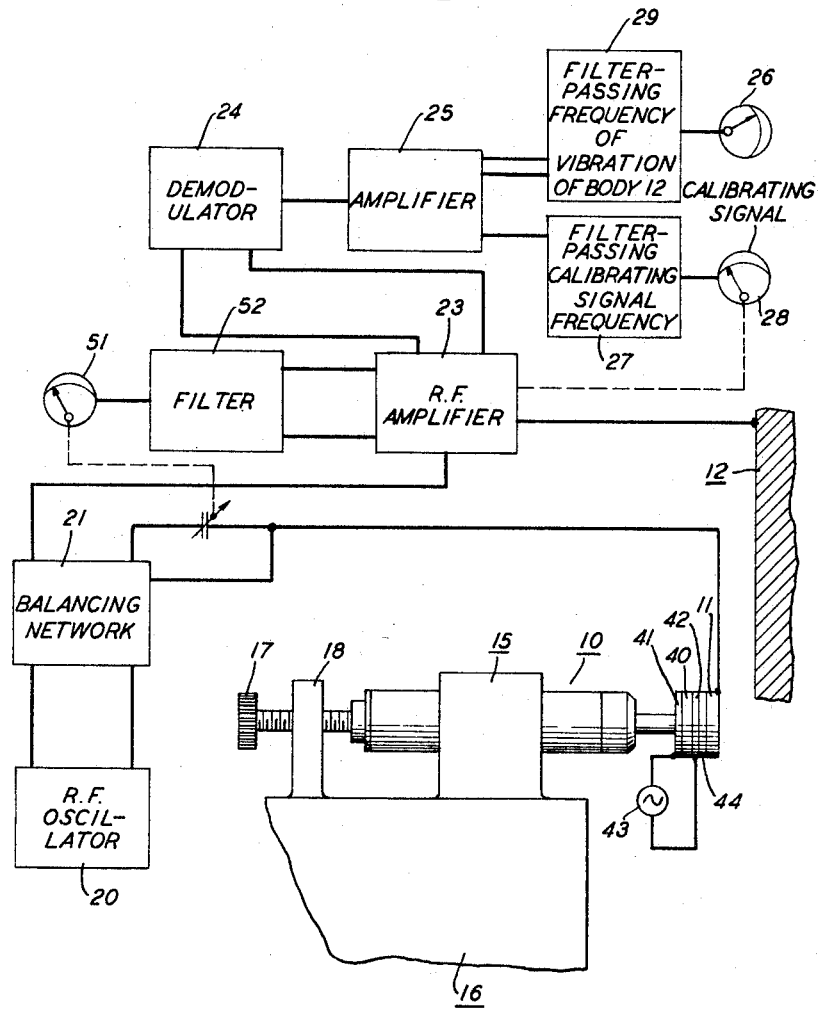

United States Patent Office 3,502,969
Patented Mar. 24, 1970

3,502,969
ERROR CORRECTION IN CAPACITIVE GAGES
Jeofry S. Courtney-Pratt, Springfield, and Edward Eisner, Gillette, N.J., assignors to Bell Telephone Laboratories, Incorporated, Murray Hill, N.J., a corporation of New York
Filed Dec. 30, 1966, Ser. No. 606,240
Int. Cl. G01r 27/26
U.S. Cl. 324—61     1 Claim

ABSTRACT OF THE DISCLOSURE

The specification describes two techniques for calibrating capacitive gages. One of these provides a mechanical oscillation to the gage head giving rise to an electrical signal. Using this signal for zero calibration the normal capacitive measurement will be accurate irrespective of transient changes either in the spacing of the gage from the body being measured or in the electrical circuit. The second technique involves the continuous monitoring and adjusting of the physical spacing between the gage head and the test body using an air gage technique.

---

Figure 1:
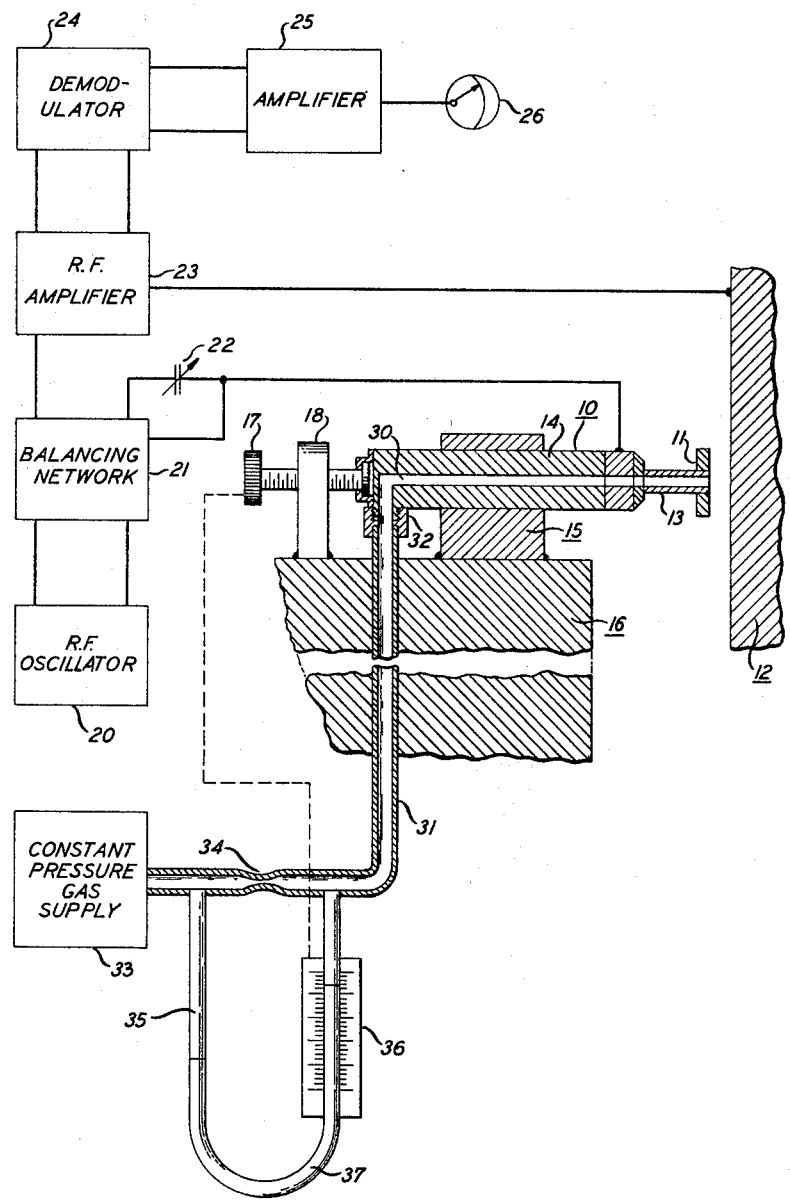

This invention relates to capacitive gages. Specifically it is directed to capacitive gages in which gage errors are eliminated.

Capacitive gages are useful for making a variety of measurements such as strains, torque, vibration, and concentricity of a revolving cylinder. These measurements are made by detecting changes in capacity between the gage head and the body being tested, due to displacement of the body. Such measurements are particularly susceptible to gage errors usually involving either an accidental displacement of the gage head relative to the surface being measured, or a transient change in the electrical circuit or electrical components used to make the capacity measurement. Errors resulting from displacement of the gage head can occur quite easily in practice through accidental jarring of the measuring apparatus or the test body, or from differential thermal expansion or contraction between the gage and test body due to environmental changes. Since capacitive gages are capable of measuring excursions of less than $10^{-7}$ inches these artificial displacements can contribute significant errors to sensitive measurements.

Errors deriving from changes in the electrical circuit are very often attributable to stray capacitances usually near the gage head. In a typical sensitive capacitive gage, a capacity change of 0.1 pf. gives a full scale deflection. It will be appreciated that stray capacities can introduce significant errors. Temperature stability for a typical device may be 0.0025 pf./° C. Thus a 4° C. change in the ambient introduces a 10 percent error in the aforementioned gage. Very often the temperature sensitivity is considerably greater.

The problem due to unwanted changes in spacing is overcome according to one embodiment of this invention by providing an air gage in combination with the capacitive gage head to continuously monitor the physical spacing between the gage head and the surface of the body being tested.

In a further embodiment of this invention all gage errors are eliminated by providing a standard displacement at the gage head against which the electrical circuit is calibrated.

These and other aspects of the invention may be more easily appreciated from a consideration of the following detailed description. In the drawing:

In the drawing:

FIG. 1 is a front elevation mostly in section of a gage incorporating a first embodiment of this invention including a schematic circuit arrangement for making the capacity measurement; and FIG. 2 is a front elevation mostly in section of another embodiment of the invention with a schematic representation of its associated measuring circuit.

In FIG. 1 the gage head, indicated generally at 10, is shown in a sectional front elevation view. The head of the gage 11 is a flat plate which constitutes one plate of an electrical condenser with the surface of the body 12 being tested constituting the other plate. The head 11 is attached by a spindle 13 to the member 14 which is mounted in a support block 15 rigidly attached to a platform 16. At the rear end of the electrically insulating member 14 an adjusting screw 17, threaded in support 18, is affixed for adjusting the spacing between the condenser plates 11 and 12. In actual construction the means for mounting the gage head and the adjustment mechanism are of high precision and stability to provide accurate adjustments between the gage head and the test body.

The electrical circuit for measuring changes in capacitance between the head 11 and the workpiece 12 is shown in the schematic diagram. The oscillator 20 provides an alternating supply potential (of a frequency considerably higher than that of the vibrations to be measured) for a bridge circuit composed of a balancing network bridge 21, including the capacitance being measured and a variable capacitor 22 for balancing the bridge to give a zero reading. The circuit includes R.F. amplifier 23, demodulator 24 which eliminates the carrier frequency produced by oscillator 20, and amplifier 25 for amplifying the signal at the frequency of the excursions being measured. The output is indicated on the meter 26. In operation, with the gage head in place, the oscillator supplies a small R.F. voltage to the capacitive bridge. The capacitor 22 is adjusted to give a zero reading on meter 26. Any asymmetry in the balancing network which involves the capacitance at 22 and the capacitance between the head 11 and workpiece 12 results in an "out of balance" voltage at the input of the R.F. amplifier 23 and a consequent deflection of the meter 26. Any accidental change in the spacing between the head 11 and the workpiece 12 introduces an unknown error in the gage calibration.

Changes of spacing small compared to the spacing itself produce deflection of the meter nearly enough proportional to the change of spacing. However, over larger changes of spacing the out-of-balance voltage varies nonlinearly. Thus the change in meter reading for a given small change in the spacing depends on the spacing. If, therefore, we wish to maintain the meter calibration for, say, small oscillatory displacements, we must maintain the mean spacing at a constant value. Consequently, according to a first embodiment of the invention an air gage is provided in combination with the head of the capacitive gage to continuously monitor the physical spacing between the head 11 and workpiece 12. In the particular structure shown in FIG. 1 a passage 30 is provided through the member 14 and the head 11 terminating in the open space being monitored. A tube 31 is connected to the member 14 at bushing 32, communicating with the passage 30. The tube 31 is connected to a constant pressure gas supply 33. In the tube 31 is a flow meter consisting of a constriction 34, the U-shaped tube 35 and a calibrated level-indicator 36. The level of the fluid 37 within the tube indicates the pressure drop across the constriction. This pressure difference indicates the gas flow rate. When the flow rate is adjusted so that the back pressure at the orifice in the head 11 is a significant impedance to flow, the level of the fluid 37 indicates the spacing being monitored according to well-known principles of fluid dynamics. The adjustment, made at 17, can be done manually or can be automatically actuated by an appropriate servomechanism controlled by an electric metering device at 36. The monitoring and adjustment of the capacitor spacing between the gage head and the object being measured may be continuous or intermittent, as desired.

The electrical circuit for measuring the capacity changes can be modified considerably and still achieve essentially the same result. For instance the changes in the capacity between the gage head and the test body can be used to modulate the frequency of the source signal. The amplifying arrangement is largely a matter of choice. A balancing or bridge network is an effective means for obtaining high sensitivity but this can be eliminated also. The specific details of the electrical circuit are not considered to be a basic feature of the invention although the circuit described by its function and certain specific arrangements described herein constitute portions of inventive combinations.

A specific embodiment of another form of this invention is shown in FIG. 2. Here the gage is shown as in FIG. 1 and has essentially the same construction without provision for the air gage but with an added feature. A standard mechanical oscillation is provided at the gage head by the use of a transducer 40 attached to the plate 11 in such a manner that the plate 11 vibrates at a fixed known amplitude and frequency. The frequency of this transducer is selected at a value distinct from the frequency of the oscillator 20 and from the frequency of the oscillations or vibrations of the body 12 being tested. The reason for this restriction will become apparent in the discussion of the electrical measurements and gage corrections. The transducer may be any electro-mechanical device suited for this purpose. For instance, a piezoelectric transducer made of barium titanate or quartz and stable with temperature and aging would be appropriate. The transductor 40 is shown here with electrode surfaces 41 and 42 to which signal source 43 is connected. The plate 40 and its associated electrodes should be isolated electrically from the gage head 11. The insulating layer 44 is provided for this purpose.

The basic measuring circuit is the same in principle as that shown in FIG. 1 except that a separate means is provided to monitor the mechanical calibrating signal impressed on the measuring capacitor at head 11. The calibrating signal is chosen so that its frequency is easily distinguishable, by using a filter network, from the frequency of vibration of the body being tested. The filter circuit provided to distinguish between the two signals includes filter 29 which passes the frequencies vibration of body 12 to meter 26.

The mechanical calibrating oscillation of plate 11 which is generated by the transducer 40, produces an electrical signal of known frequency. The amplitude of this signal, even for constant amplitude of vibration of plate 11, would ordinarily depend on the mean spacing between plate 11 and body 12 and on the electrical network. This electrical signal at this standard frequency is passed by filter 27 to instrument 28. Changes, accidental or intentional, in the mean spacing between plate 11 and body 12 or in the common electrical network will affect the electrical signal corresponding to the mechanical calibrating vibration and the electrical signals corresponding to vibration of the body 12 in the same proportion.

Thus the ratio of the readings of meters 25 and 28 gives an accurate measure of the amplitude of the vibration of the body 12.

A convenient way of using this property is to keep the signal on meter 28 constant by adjustment of the mean spacing between plate 11 and body 12. This could be done manually or could be effected by a servomechanism acting on the adjustment 17. Alternatively, the gain of, say, the amplifier 23, or the output of the oscillator 20 could be adjusted to achieve the same effect.

For the purpose of this invention the balance of the bridge circuit is not crucial, and in any case can be achieved to the degree desired by any of the techniques well known in the art. A typical indication of balance could be obtained, for example, from a meter 51 fed by a filter 52 which latter would pass the frequency of the oscillator 20 and which would reject the frequencies of the calibrating signal 43 and those of vibration of the body 12.

The following values are exemplary of a specific apparatus constructed according to the principles of this invention.

Spacing between gage head 11 and test body 12: 1/100 cm.
Diameter of gage head: 1 cm.
Capacitance at gage head: 5 pf.
Oscillation amplitude of test body: $10^{-4}$ cm.
Oscillation frequency of test body: 10 to 1000 c./s.
Source (or carrier) frequency: 50,000 c./s.
Frequency of oscillation of transducers: 5000 c./s.
Oscillation amplitude of transducer: $10^{-4}$ cm.

As long as the last two values are kept constant the calibration scheme of this invention will result in an accurate gage reading irrespective of electrical variations in the measuring circuit including stray capacitances and accidental changes in spacing at the gage head.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A capacitive gage for the measurement of displacement comprising an electrically conductive gage head for mounting close to an electrically conductive surface of a test body for which small and continuously changing displacements are to be measured, and electrical means for measuring electrical capacity changes between the gage head and the test body wherein the improvement comprises an air gage having a fluid passage through the gage head; and means for adjusting the physical spacing between the gage head and test body in response to changes measured by the air gage for measuring the physical spacing between the gage head and the test body.

References Cited

UNITED STATES PATENTS

| 1,946,924 | 2/1934 | Allen et al. | 33—125 |
| 3,059,466 | 10/1962 | Urmenyi | 73—37.7 |
| 3,243,992 | 5/1966 | Woods | 73—37.5 |
| 3,180,136 | 4/1965 | Foster | 73—71.4 |
| 3,238,766 | 3/1966 | Hollis | 73—37.5 |
| 3,379,972 | 4/1968 | Foster et al. | 324—61 |

EDWARD E. KUBASIEWICZ, Primary Examiner

U.S. Cl. X.R.

73—37.5